United States Patent [19]

Mayer-Dick et al.

[11] Patent Number: 5,433,109
[45] Date of Patent: Jul. 18, 1995

[54] DEVICE FOR RECORDING THE INSTANT AT WHICH INJECTION STARTS IN AN INJECTION VALVE

[75] Inventors: Anton Mayer-Dick, Fürth; Manfred Weigl, Nürnberg, both of Germany

[73] Assignee: Siemens Aktiengesellschaft, Munich, Germany

[21] Appl. No.: 113,409

[22] Filed: Aug. 27, 1993

Related U.S. Application Data

[63] Continuation of PCT/EP92/00254, Feb. 5, 1992.

Foreign Application Priority Data

Feb. 27, 1991 [EP] European Pat. Off. ........ 91102942.9

[51] Int. Cl.$^6$ .................. G01M 15/00; F02M 65/00
[52] U.S. Cl. .................................................. 73/119 A
[58] Field of Search .................. 73/119 A, 47, 49.7

[56] References Cited

U.S. PATENT DOCUMENTS

| | | | |
|---|---|---|---|
| 3,940,692 | 2/1976 | Neilson | 324/76.17 |
| 4,145,932 | 3/1979 | Pagel | 73/119 A |
| 4,426,981 | 1/1984 | Greiner et al. | 73/119 A |
| 4,612,597 | 9/1986 | Hamren | 361/152 |
| 4,736,267 | 4/1988 | Karlmann et al. | 361/101 |
| 4,791,809 | 12/1988 | Schmidt | 73/119 A |
| 5,038,744 | 8/1991 | Martin et al. | 123/625 |
| 5,182,517 | 1/1993 | Thelen et al. | 324/418 |

FOREIGN PATENT DOCUMENTS

| | | | |
|---|---|---|---|
| 438640 | 7/1991 | European Pat. Off. | |
| 54-060804 | 12/1980 | Japan | |
| 0070879 | 4/1984 | Japan | 73/119 A |
| 0182354 | 9/1985 | Japan | 73/119 A |
| 1105084 | 4/1989 | Japan | |

*Primary Examiner*—Richard E. Chilcot, Jr.
*Assistant Examiner*—James M. Olsen
*Attorney, Agent, or Firm*—Herbert L. Lerner; Laurence A. Greenberg

[57] ABSTRACT

An internal combustion engine has an injection valve. A device for recording an instant at which injection starts in the injection valve includes a differentiating device connected to the injection valve for receiving current through the injection valve and emitting an output signal corresponding to a second derivative of a variation in current with respect to time. A threshold value stage is connected to the differentiating device for receiving the output signal and generating a threshold signal whenever the output signal exceeds a threshold value. A logic device is connected to the threshold value stage for recognizing the instant at which injection starts when the threshold signal occurs for a second time after a triggering instant of the injection valve.

6 Claims, 1 Drawing Sheet

DEVICE FOR RECORDING THE INSTANT AT WHICH INJECTION STARTS IN AN INJECTION VALVE

CROSS-REFERENCE TO RELATED APPLICATION

This application is a Continuation of International Application Serial No. PCT/EP92/00254, filed Feb. 5, 1992.

BACKGROUND OF THE INVENTION

Field of the Invention

The invention relates to a device for recording or determining the instant at which injection starts in an injection valve of an internal combustion engine, having a differentiating device to which current through the injection valve is supplied and which emits an output signal.

Such a device is known, for example, from German Patent DE 28 05 175, corresponding to U.S. Pat. No. 4,228,680. In that device, a mechanical/electrical motion pick-up is provided which generates an electrical signal corresponding to a lift motion of the injection valve. The signal is supplied in differentiated form to a threshold value switch having a response which marks the start of injection.

Due to the differentiation of the pick-up signal, the instant at which injection starts can be recognized more rapidly and more accurately than it would be if the non-differentiated pick-up signal were inspected.

The device requires such a motion pick-up for each injection valve being inspected. However, due to the trend towards smaller and smaller injection valves, it is becoming increasingly more difficult and expensive to provide such pick-ups.

A device for checking a magnetic valve for the injection system of an internal combustion engine is known from Published Japanese Abstract No. 1-105084. Changes in the shape of the curve of the triggering current are used to recognize erroneous functioning of that valve and are differentiated for easier analysis of the signal.

SUMMARY OF THE INVENTION

It is accordingly an object of the invention to provide a device for recording the instant at which injection starts in an injection valve, which overcomes the hereinafore-mentioned disadvantages of the heretofore-known devices of this general type, which simplifies such a device and which nevertheless very accurately records the instant at which injection starts.

With the foregoing and other objects in view there is provided, in accordance with the invention, in an internal combustion engine having an injection valve, a device for recording an instant at which injection starts in the injection valve, comprising a differentiating device connected to the injection valve for receiving current through the injection valve and emitting an output signal corresponding to a second derivative of a variation in current or a path or flow of current with respect to time; a threshold value stage connected to the differentiating device for receiving the output signal and generating a threshold signal whenever the output signal exceeds a threshold value; and a logic device connected to the threshold value stage for recognizing the instant at which injection starts when the threshold signal occurs for a second time after a triggering instant of the injection valve.

In accordance with another feature of the invention, the differentiating device has two operational amplifiers connected in series as differentiators.

In accordance with a further feature of the invention, the threshold value stage is a Schmitt trigger.

In accordance with an added feature of the invention, there are provided means for extending the increased triggering current flowing after recognition of the instant at which injection starts, by a given factor of a time between the triggering instant and the instant at which injection starts and then reducing the current to a holding current being lower relative to the triggering current.

In accordance with an additional feature of the invention, the given factor is between $\frac{1}{4}$ and $\frac{1}{2}$.

In accordance with a concomitant feature of the invention, there are provided means for limiting a maximum triggering current to a value which can be chosen.

The invention does not use a special motion pick-up, but rather the instant at which injection starts, i.e the motion of the valve, is recognized from the triggering signal for the injection valve itself.

In the rest condition, an injection valve represents, to a first approximation, a series circuit being formed of an inductivity and an ohmic resistance. Therefore, after the valve is switched on, the current increases uniformly and is subsequently only limited by the ohmic resistance. Finally, if the valve moves from the rest position (start of motion), there is a change in inductivity and therefore a change in the increase of current (change in the first derivative of the triggering current dJ/dt). There is a further clear change in the inductivity when the end position is reached (end of motion).

In accordance with the invention, these instants are recognized by twice differentiating the current flowing through the injection valve. This second derivative of the current then only gives a positive value if the slope of the current, i.e. the first derivative, increases.

This is the case for the first time at the triggering instant and then on the occurrence of the previously mentioned changes in inductivity at the start of motion and the end of motion. In the case of low-ohm valves, there is a larger second derivative at the start of motion. There is a larger second derivative at the end of motion in the case of high-ohm valves. For this reason, it is recommended that the start of motion should be detected as the instant at which injection starts in the case of low-ohm valves and that the end of motion should be detected as the instant at which injection starts in the case of high-ohm valves. This selection takes place by choosing the level of a threshold value of a threshold value stage to which the signal corresponding to the second derivative is supplied. This threshold value stage also prevents effects due to interference and non-linearities. It follows that the instant after the triggering instant, at which the threshold value stage responds for the second time, is always equivalent to the instant at which injection starts.

Since the current through the injection valve is inspected directly, valve tolerances have no effect. The device can be applied equally well to any type of injection valve. The influence of fluctuating supply voltages does not have any effect either, because the change in the rate of increase is inspected in the analysis.

A further advantage is the possibility of diagnosis by inspecting the interval between the valve triggering and the valve motion. If this interval is increased beyond a certain amount, for example, either the valve properties have changed or the supply voltage is outside the specified tolerance. Short circuits and open circuits can likewise be recognized.

Other features which are considered as characteristic for the invention are set forth in the appended claims.

Although the invention is illustrated and described herein as embodied in a device for recording the instant at which injection starts in an injection valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
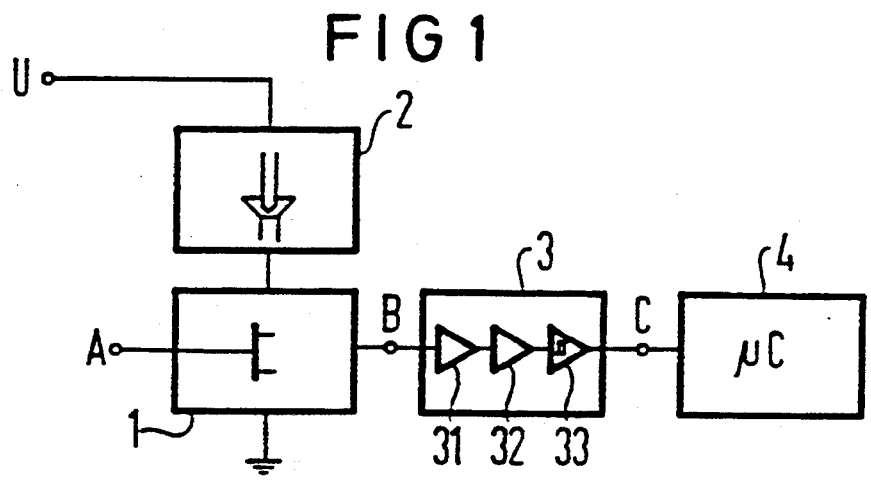
FIG. 1 is a simplified block circuit diagram of the triggering of an injection valve and a device for recording the instant at which injection starts.

Referring now to the figures of the drawing in detail and first, particularly, to FIG. 1 thereof, there is seen an injection valve 2 that is connected to a voltage U by means of a switch 1. The injection valve 2 is used for the injection of fuel in an internal combustion engine. In the case of single-point injection, only one such injection valve 2 can be provided or, in the case of multi-point injections, one injection valve 2 can be correspondingly provided for each cylinder. In the following embodiment example, one injection valve 2 is assumed. In the case of a plurality of injection valves, what has been stated applies analogously in each case to the others. A variation in current represented in FIG. 2 is typical of low-ohm valves ($R_i < 2\ \Omega$).

When the switch 1 is closed, the injection valve 2 is opened by a flow of current which follows. The switch 1 is any given suitable switch, in particular a semi-conductor switch such as a MOSFET. Triggering of the switch 1 takes place by means of a non-illustrated engine control which triggers the switch through a measuring point A.

Figure 2:
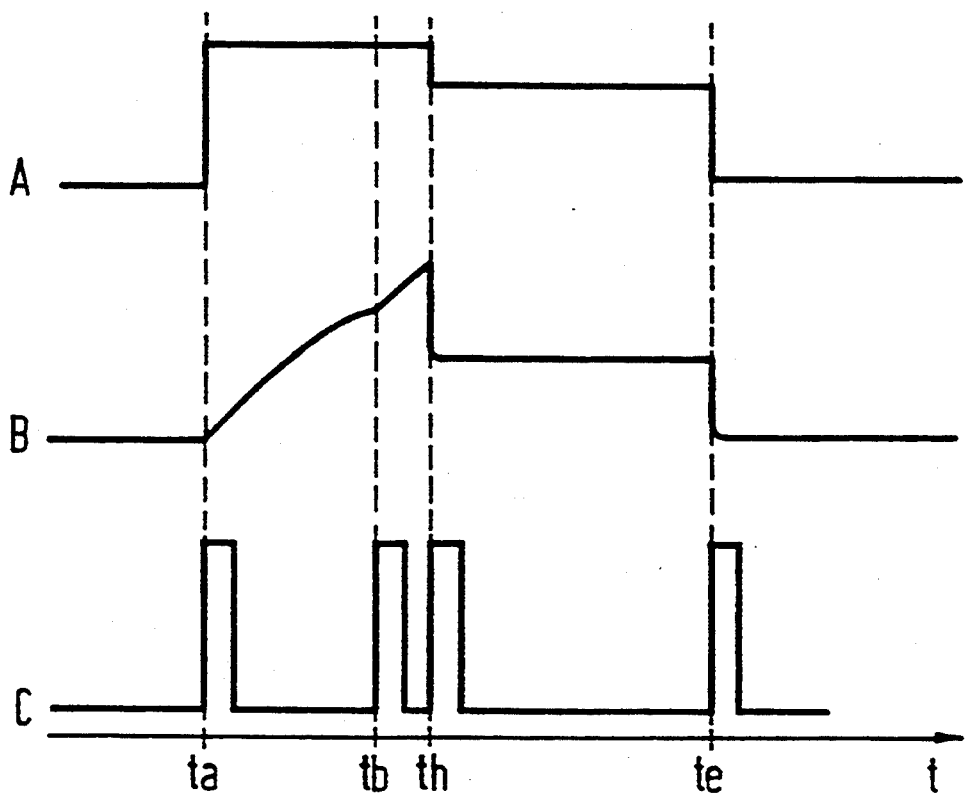
FIG. 2 is a diagram showing the variation in current at various points on the block circuit diagram of FIG. 1.

A signal at the measuring point A is shown plotted against time t in FIG. 2. The switch 1 is closed at a triggering instant or point in time ta. Due to this action, current through the injection valve 2 increases with a constant slope beginning at 0. This variation in current is plotted in FIG. 2 for a measuring point B in FIG. 1. The actual motion of the valve only starts when the current has increased to such a point that a force generated by it is greater than counteracting forces (spring preload, fuel pressure, etc., friction of the injection valve 2). In FIG. 2, this instant of the start of motion of the injection valve 2 is an instant tb at which injection starts because only then can the fuel pass the injection valve 2. After the opening of the injection valve 2, the current is limited to a holding current until a switch-over instant th. This is done in order to reduce the lost power, i.e. the thermal loading (the valve only needs to be held in the end position). Finally, at a switch-off instant te, the switch 1 is opened again and the flow of current is therefore interrupted. The injection valve 2 then returns to its closed rest position by means of spring force.

The device according to the invention for recording the instant tb at which injection starts makes use of the effect which was already described, namely that the slope of the current through the injection valve 2 changes at the instant tb at which injection starts. For this purpose, the current through the injection valve 2 is supplied through the measuring point B to a processing circuit 3. The processing circuit 3 contains two differentiating stages 31, 32 and a threshold value stage 33, connected in series. The differentiating stages 31, 32 are appropriately connected operational amplifiers and the threshold value stage 33 is a Schmitt trigger. An output signal at a measuring point C in FIG. 1, therefore corresponds to the twice differentiated current through the injection valve 2. Due to the threshold value stage, interference effects or minimal changes in slope before the instant tb at which injection starts, have no effect as long as the threshold value set has not been reached. The level of this threshold value is specific to the application.

Since the second derivative corresponds to the change in the first derivative, i.e. to the change in the slope of the variation in current, a pulse-shaped threshold signal occurs for the first time, at the measuring point C, at the triggering instant ta, as may be seen from FIG. 2.

The next change in slope, and therefore the next threshold signal, occurs at the instant tb at which injection starts.

Further threshold signals occur at the switch-over instant th and at the switch-off instant te.

As may be seen from FIG. 1, the threshold signals are supplied to a logic device 4. The logic device 4 is a microcomputer with corresponding input wiring. It recognizes the instant tb at which injection starts with the arrival of the second threshold signal after the triggering instant ta. A signal for the triggering instant ta is supplied to the logic device 4 through the measuring point A or directly from the engine control triggering the switch 1. In accordance with a preferred embodiment, the functions of the logic device 4 are integrated into the engine control that is already present. This dispenses with such signal transmission.

Furthermore, the device according to the invention permits operation of the injection valve 2 in a manner which is both careful and economical in terms of power. On one hand, as is known, the triggering current for injection valves should be as large as possible in order to ensure rapid opening. On the other hand, this is associated with a severe impact on the stop or stop bounce or chatter and an increased current requirement occurs due to a late switch-over from the triggering current to a lower holding current.

A favorable compromise between triggering current and holding current can now be found by means of the accurate knowledge of the instant at which injection starts. The triggering current is therefore extended after the recognition of the instant at which injection starts by a certain factor of the time between the valve triggering and the valve motion and is then switched over to holding current. The factor is determined by tests, and values between $\frac{1}{4}$ and $\frac{1}{2}$ have been found to be particularly favorable. The maximum triggering current is limited to approximately 4 amps so that, in the case of possible faults, overloading of the injection valve 2 in association with the switch-over is avoided.

Furthermore, the logic device 4 carries out a diagnosis function. On one hand, this checks whether or not the appropriate threshold signals per triggering cycle occur, i.e. from each triggering instant ta to the switch-off instant te. On the other hand, the interval between the triggering instant ta and the instant tb at which injection starts is taken into consideration. For this purpose, a reference value for this interval is stored and this reference value should not be exceeded in the case of a functioning injection valve 2 and a correct voltage U. A faulty injection valve 2 and/or an unallowable voltage U can be recognized by comparing the interval actually determined with this reference value.

We claim:

1. In an internal combustion engine having an injection valve actuated by a current through the injection valve, a device for recording an instant at which injection starts in the injection valve, comprising:
    a differentiating device connected to the injection valve for receiving current through the injection valve by which the injection valve is actuated and emitting an output signal corresponding to a second derivative of the current with respect to time;
    a threshold value stage connected to said differentiating device for receiving the output signal and generating a threshold signal whenever the output signal exceeds a threshold value; and
    a logic device connected to said threshold value stage for recognizing the instant at which injection starts when the threshold signal occurs for a second time after a triggering instant of the injection valve.

2. The device according to claim 1, wherein said differentiating device has two operational amplifiers connected in series as differentiators.

3. The device according to claim 1, wherein said threshold value stage is a Schmitt trigger.

4. The device according to claim 1, wherein the injection valve is opened with an increased triggering current through the valve, and wherein a given time period is defined between the triggering instant and the instant at which injection starts, and including means for extending a time during which the increased triggering current flows after recognition of the instant at which injection starts, by a given factor of the given time period and then reducing the current to a holding current being lower relative to the triggering current and holding the injection valve open with the holding current.

5. The device according to claim 4, wherein said given factor is between $\frac{1}{4}$ and $\frac{1}{2}$.

6. The device according to claim 4, including means for limiting a maximum triggering current to a value which can be chosen.

* * * * *